United States Patent
Pyhrr

(10) Patent No.: US 12,213,476 B2
(45) Date of Patent: Feb. 4, 2025

(54) PIN-RETAINED SNAKE BARRIER

(71) Applicant: Atrox Snake Barrier, LLC, Dallas, TX (US)

(72) Inventor: Eric C. Pyhrr, Midlothian, TX (US)

(73) Assignee: Atrox Snake Barrier, LLC, Dallas, TX (US)

( * ) Notice: Subject to any disclaimer, the term of this patent is extended or adjusted under 35 U.S.C. 154(b) by 182 days.

(21) Appl. No.: 17/830,041

(22) Filed: Jun. 1, 2022

(65) Prior Publication Data

US 2023/0389537 A1    Dec. 7, 2023

(51) Int. Cl.
  *A01M 29/30*    (2011.01)
  *A01G 13/10*    (2006.01)
  *A01K 3/00*    (2006.01)

(52) U.S. Cl.
  CPC ........... *A01M 29/30* (2013.01); *A01G 13/105* (2013.01); *A01K 2003/007* (2013.01)

(58) Field of Classification Search
  CPC ........... A01G 13/105; A04K 2003/007; A01M 29/30; A01K 2003/007
  See application file for complete search history.

(56) References Cited

U.S. PATENT DOCUMENTS

| | | | |
|---|---|---|---|
| 1,764,284 A | 6/1930 | Barton |
| 2,517,386 A | 8/1950 | Cooper |
| 2,835,223 A | 5/1958 | Erickson |
| 3,165,853 A | 1/1965 | Ansell |
| 3,450,187 A | 6/1969 | Foltz |
| 4,286,405 A | 9/1981 | Howard |
| 4,301,996 A | 11/1981 | Holyoak |
| | (Continued) | | |

FOREIGN PATENT DOCUMENTS

| | | |
|---|---|---|
| CN | 201180393 Y | 1/2009 |
| CN | 202706667 U | 1/2013 |
| | (Continued) | |

OTHER PUBLICATIONS

International Search Report and Written Opinion in International Patent Application No. PCT/US2017/015722, dated Apr. 12, 2017, 15 pages.

(Continued)

*Primary Examiner* — Andrew J Triggs
(74) *Attorney, Agent, or Firm* — Foley & Lardner LLP; John J. May

(57) ABSTRACT

A snake barrier includes a plurality of barrier sections forming a boundary, each barrier section includes material in the form of an upright portion and an overhang portion extending generally perpendicular to the upright portion. A first support brace is removably coupled to a first base plate using a first retainer pin and is secured to the material at a first end of the barrier section. The first support brace includes a first upright member supporting the upright portion and a first overhang support member supporting the overhang portion. A second support brace is removably coupled to a second base plate using a second retainer pin and is secured to the material at a second end of the barrier section opposite the first end, the second support brace includes a second upright member supporting the upright portion and a second overhang support member supporting the overhang portion.

16 Claims, 10 Drawing Sheets

(56) References Cited

U.S. PATENT DOCUMENTS

| | | | |
|---|---|---|---|
| 4,319,423 A | 3/1982 | Judd | |
| 4,449,316 A | 5/1984 | Moorhead | |
| 4,489,516 A | 12/1984 | Moorhead | |
| 4,566,219 A | 1/1986 | Firth | |
| 5,063,876 A | 11/1991 | Harris | |
| 5,267,724 A | 12/1993 | Heath et al. | |
| 5,299,781 A | 4/1994 | Barrett | |
| 5,638,635 A | 6/1997 | Palladino | |
| 5,934,651 A | 8/1999 | Koljonen | |
| 5,967,089 A | 10/1999 | Allen | |
| 6,206,347 B1 | 3/2001 | Kelley | |
| 6,271,533 B1 | 8/2001 | O'Brien | |
| 6,336,290 B1 | 1/2002 | Callan | |
| 7,011,587 B2 * | 3/2006 | James | A63C 19/08 473/92 |
| 7,562,453 B1 | 7/2009 | Benner et al. | |
| 7,640,693 B2 | 1/2010 | McLemore | |
| 7,793,920 B2 | 9/2010 | Bauer et al. | |
| 8,308,141 B1 | 11/2012 | Mellins et al. | |
| 8,402,630 B2 | 3/2013 | McGinn et al. | |
| 8,540,456 B2 | 9/2013 | Marshall | |
| 8,616,531 B2 | 12/2013 | Hough et al. | |
| 10,024,077 B2 * | 7/2018 | Witherspoon | E04H 17/003 |
| 2008/0277638 A1 | 11/2008 | Benner et al. | |
| 2009/0013597 A1 | 1/2009 | Orton | |
| 2009/0152522 A1 | 6/2009 | Underwood | |
| 2009/0159220 A1 | 6/2009 | Henning | |
| 2009/0176067 A1 | 7/2009 | Palley et al. | |
| 2010/0243979 A1 * | 9/2010 | Moore | E04H 17/003 256/19 |
| 2012/0068135 A1 | 3/2012 | Lill | |
| 2013/0026432 A1 | 1/2013 | Horvat | |
| 2013/0193393 A1 | 8/2013 | Mellins et al. | |
| 2014/0208643 A1 | 7/2014 | Inglis et al. | |
| 2017/0009485 A1 | 1/2017 | Gentry et al. | |
| 2017/0086393 A1 | 3/2017 | Guigan | |
| 2017/0226770 A1 | 8/2017 | Witherspoon et al. | |
| 2023/0011600 A1 * | 1/2023 | Crowle | A01M 29/30 |
| 2023/0389537 A1 * | 12/2023 | Pyhrr | A01M 29/30 |

FOREIGN PATENT DOCUMENTS

| | | |
|---|---|---|
| DE | 29 45 292 | 5/1981 |
| GB | 2 095 962 | 10/1982 |
| WO | WO-96/07312 | 3/1996 |
| WO | WO-2013/157923 A1 | 10/2013 |
| WO | WO-2021/226598 A1 | 11/2021 |

OTHER PUBLICATIONS

International Search Report and Written Opinion for International Patent Application PCT/US2023/023842 dated Oct. 6, 2023.

* cited by examiner

PIN-RETAINED SNAKE BARRIER

CROSS-REFERENCE TO RELATED APPLICATIONS

This application is cross-referenced to U.S. Pat. No. 10,024,077, filed on Feb. 5, 2016, and entitled Low-Profile Snake Barrier, the disclosure of which is hereby incorporated by reference.

TECHNICAL FIELD

This disclosure relates to snake barriers, and in particular, to snake barriers configured to prevent passage of a snake over the barrier.

BACKGROUND

People are inherently afraid of snakes, often because of the stealthy manner in which they live and move around, but more often because many snakes have a deadly bite. Many people cannot differentiate between a venomous snake and a non-venomous snake, and thus are afraid of all snakes.

The Crotalid family (pit vipers) of snakes is the most prominent venomous snake in North America and is responsible for most of the human snake bite fatalities. The Crotalid family of snakes includes rattle snakes, copper heads and water moccasins. This type of venomous snake locomotes with their heads low to the ground and are seldom aboralistic, i.e., climb trees or the like. Most snakes have very poor vision and rely on Jacobson organs (smell), heat sensors and vibrations to track and catch prey and avoid predators. It is desirable to create an area of ground where crawling snakes are blocked from reaching.

SUMMARY

In some embodiments, a snake barrier protects an area from entry by snakes. An embodiment of a snake barrier includes a plurality of barrier sections forming a boundary, each barrier section includes material in the form of an upright portion and an overhang portion extending generally perpendicular to the upright portion. A first support brace is removably coupled to a first base plate using a first retainer pin and is secured to the material at a first end of the barrier section. The first support brace includes a first upright member supporting the upright portion and a first overhang support member supporting the overhang portion. A second support brace is removably coupled to a second base plate using a second retainer pin and is secured to the material at a second end of the barrier section opposite the first end, the second support brace includes a second upright member supporting the upright portion and a second overhang support member supporting the overhang portion.

When installed on the ground around an area to be protected, a snake may approach the barrier and encounter the upright portion and then attempt to crawl over the barrier, whereupon the overhang portion will prevent the snake from entering the protected area over the barrier. The snake barrier is constructed of components that are lightweight, easily assembled at a site to be protected, and thus portable.

According to another embodiment, the barrier can be constructed in sections connected together to form a boundary, which may be in the form of a complete perimeter, around an area of a desired size. The barrier can also be constructed of a flexible screen mesh supported between corner supports and intermediate supports, all of which can be rolled up in a compact roll and carried by a person to a campsite, or the like. The flexible snake barrier can be erected around a door of a tent to prevent snakes from entering the tent.

According to another embodiment, the snake barrier includes at least one section with a height that prevents a snake from crawling on the ground into an area to be protected from snakes. The barrier has an overhang portion that extends outwardly away from the area to be protected from snakes, whereby when a snake attempts to crawl up an upright portion, it is confronted with the overhang portion and is prevented from crawling over the barrier.

BRIEF DESCRIPTION OF THE DRAWINGS

Further features and advantages will become apparent from the following and more particular description of the preferred and other embodiments, as illustrated in the accompanying drawings in which like reference characters generally refer to the same parts, functions or elements throughout the views, and in which.

DETAILED DESCRIPTION

In some embodiments, a snake barrier is erected to block snakes and many other small reptiles and animals from reaching a particular protected area. Snakes, in particular, are deterred when confronted with a snake barrier and are prevented from crawling over even a low-profile snake barrier and into an area desired to be protected. Upon encountering the snake barrier, a snake will reroute its travel around the barrier and be of no consequence to those in the area protected. In other instances, the snake will encounter the snake barrier and attempt to crawl over it, as it would any other routine obstruction in its path. In this latter instance, the snake can crawl upwardly along an upright portion of the snake barrier and then encounter the lateral overhang portion, in which event the snake is again confronted with another barrier, and thus continues its travel to circumvent the obstacle.

The sections of the snake barrier may be bundled in a compact package and transported where they may be erected to create a protected area. According to one embodiment, the protected area may be protected by a low-profile snake barrier with dimensions of nine feet by nine feet. The low-profile snake barrier may be erected and held-down to a position on a hard surface, such as a tarmac of an airfield. The low-profile snake barrier of the present disclosure may also be held down on softer surfaces, such as the ground to protect one or more tents at a campsite, around eating areas, and around play areas, such as an area of a residential backyard. Stakes may be received through the base plates of the snake barrier to secure the snake barrier to the soft ground. Moreover, the snake barriers can be installed around homes, pools, gardens, animal shelters, public areas, outside toilet facilities, state and federal parks and recreation areas, picnic areas, etc., and other areas where it is desired to prevent entry of snakes and the like. The snake barriers are portable and may be easily transported to the area to be protected and easily installed, as well as easily taken down and stored after use. The snake barrier may be erected for form a circular, square, or rectangular protected area.

Figure 1A:
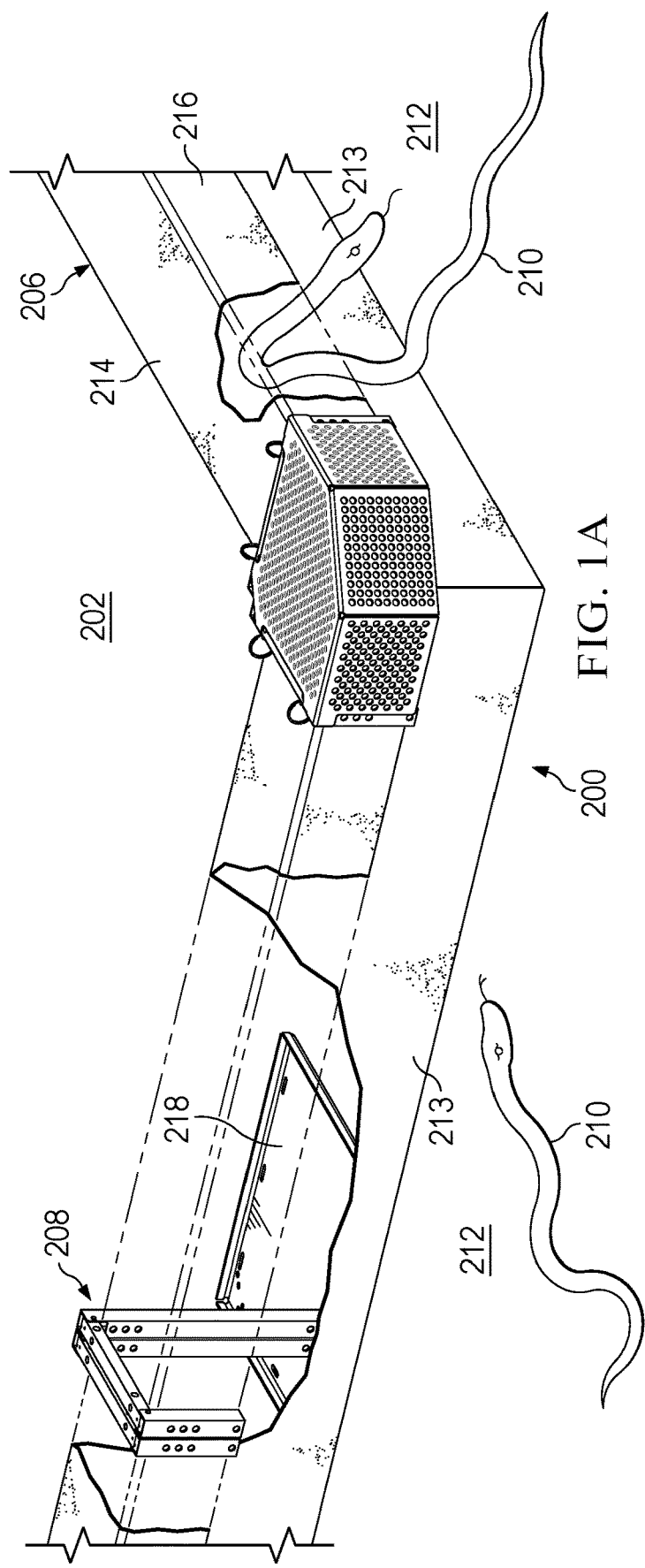
FIGS. 1A and 1B are perspective views of a portion of a snake barrier that is configured to form a perimeter around a protected area.

Reference is now made to FIG. 1A, which is a perspective view of a portion of a low-profile snake barrier 200 viewing the snake barrier 200 from an unprotected area according to an embodiment of the present disclosure. The low-profile snake barrier 200 may be erected in a perimeter to form a protected area 202 that needs to be kept free of any kind of snake. The snake barrier 200 is generally formed of a screen-type or mesh-type of material 206 that is supported and maintained as a barrier by a plurality of support braces 208. The support braces 208 are supported in an upright position by a base plate 218, as describe in more detail below. The support braces 208 are generally erected in a shape of a J-shape, as described further below.

A snake 210 slithers through an unprotected area 212 toward the protected area 202 and encounters the low-profile snake barrier 200, specifically the snake 210 slithers over a base portion 211 and is blocked by an upright portion 213 of the low-profile snake barrier 200. As described above, the snake attempts to crawl over the barrier but is blocked from breaching the snake barrier 200 by a horizontal overhang portion 214 and a skirt portion 216 and is thus deterred and prevented from further attempting to breach the barrier 200. Thus, the only directions of movement for the snake are either along the snake barrier 200 or to return from the direction it came. In either event, the snake 210 remains in the unprotected area 212 and the protected area 202, whose boundary is formed at least in part by the low-profile snake barrier 200, is free of snakes.

Figure 1B:
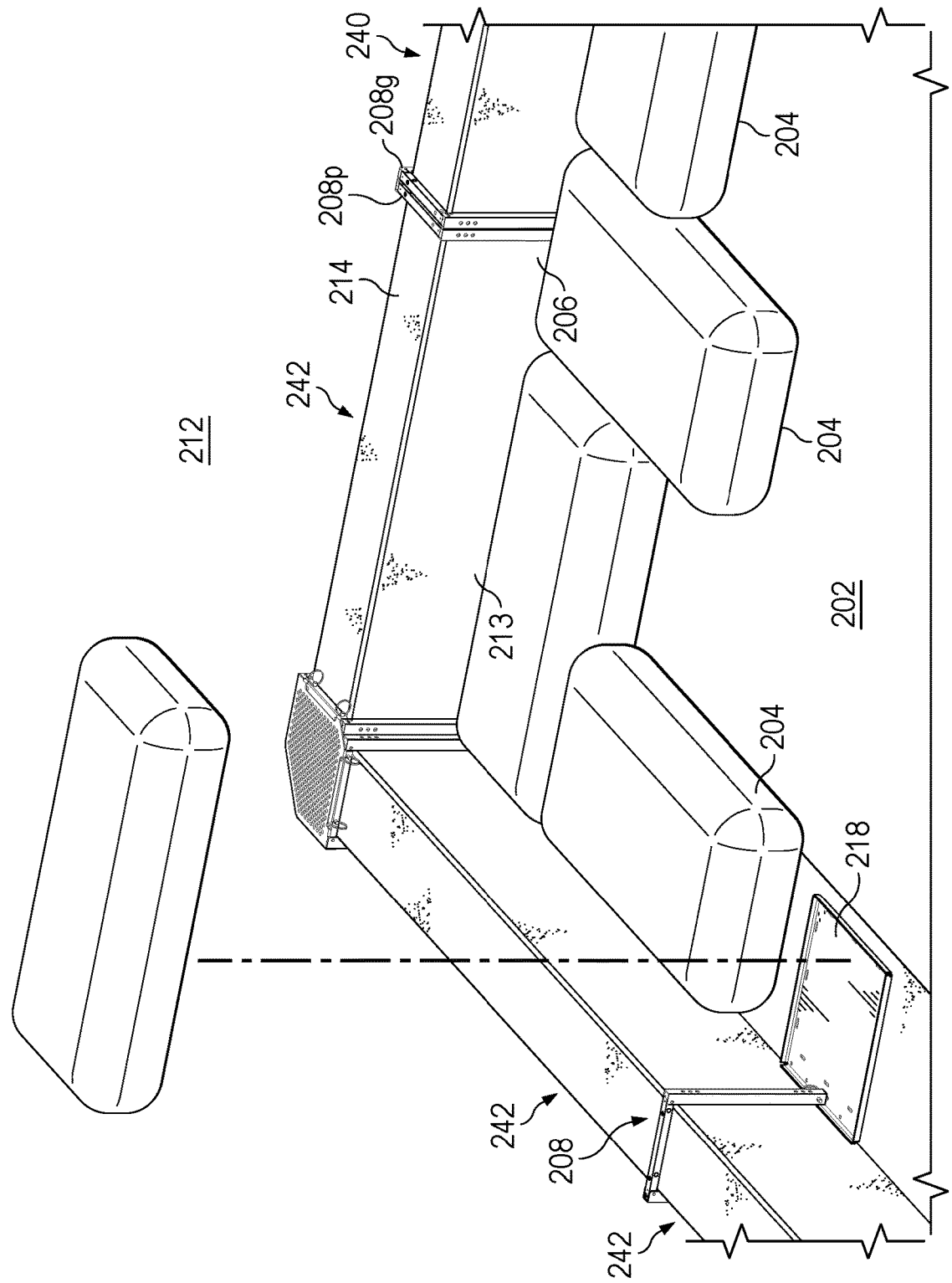

FIG. 1B is a rear perspective view of the erected snake barrier 200 with the viewer positioned in the protected area 202. FIG. 1B illustrates an embodiment where the base plates 218 and are held in position by the screen material 206 is held in place by sand bags 204. The sand bags 204 may be positioned on top of the base plate 218 to hold it down to a hard surface, such as a tarmac. Sand bags 204 are also used to hold down the screen material 206 that is located between base plates 218. Any suitable number of sand bags 204 may be used according to the teachings of the present disclosure. The screen material 206 for a respective section of the snake barrier 200 is routed beneath the base plates 218 where it can be held in place by the sand bags 204. In addition to or in lieu of sandbags 204, any material with sufficient weight to hold down the base plates 218 and the screen material 206 may be used according to the teachings of the present disclosure. For example, the base plates 218 and the screen material 206 may be held down with rocks, gravel, cinder blocks, or any other heavy materials that are capable of holding the base plate 218 in position on the ground. Similarly, the screen material 206 located between each base plate 218 can be held in place on the ground using rocks, gravel, cinder blocks, or any other heavy materials capable of holding the screen material 206 between base plates 218 to the ground.

In an alternative embodiment, the base plates 218 may receive a stake that is received through a hole in the base plate and penetrates the ground. The screen material 206 may also receive a stake through it and into the ground to secure the screen material 206 to the ground.

With continued reference to FIG. 1B, an end of a gate barrier portion 240 is shown on a right side of FIG. 1B, and a perimeter barrier portion 242 is shown on a left side of FIG. 1B. The perimeter barrier portion 242 is formed of a unitary piece of screen material supported by a support brace 208 that is secured to a base plate 218. At one or more locations along the perimeter of the snake barrier 200, a pair of support braces 208 may be supported by the same base plate 218 in a side-by-side configuration. This configuration forms an end of a removable section of the snake barrier 200 referred to as the gate barrier portion 240. The gate barrier portion 240 may be disassembled from the rest of the snake barrier 200 and removed to open the barrier 200. A vehicle or other equipment may be driven through the area opened by removing the gate barrier portion 240, and once in the protected area 202, the gate barrier portion 240 may be easily reassembled to form a closed perimeter. According to an embodiment, a gate end support brace 208g supports the gate portion 240 of the screen material 206. A perimeter support brace 208p supports the separate perimeter portion 242 of the screen material 206. The perimeter support brace 208p is disposed adjacent and abutting the gate support brace 208g, and both the perimeter support brace 208p and the gate support brace 208g are secured to the same base plate 218, as shown in FIG. 2.

When it is desired to create a temporary opening in the snake barrier 200, the sand bags (or other heavy material or stakes) 204 are removed from the gate barrier portion 240 of the snake barrier 200 including the end base plates 218 supporting the end gate support braces 208g. The gate support brace 208g and the screen material attached thereto are disassembled from the base plate 218. The same procedure may be performed at the other end of the gate barrier portion 240 supported by a second gate support brace 208g (not shown). With both gate support braces 208g disassembled from their respective base plates 218 and the sand bags 204 removed, the gate portion 240 of the snake barrier is easily removed.

Figure 2:
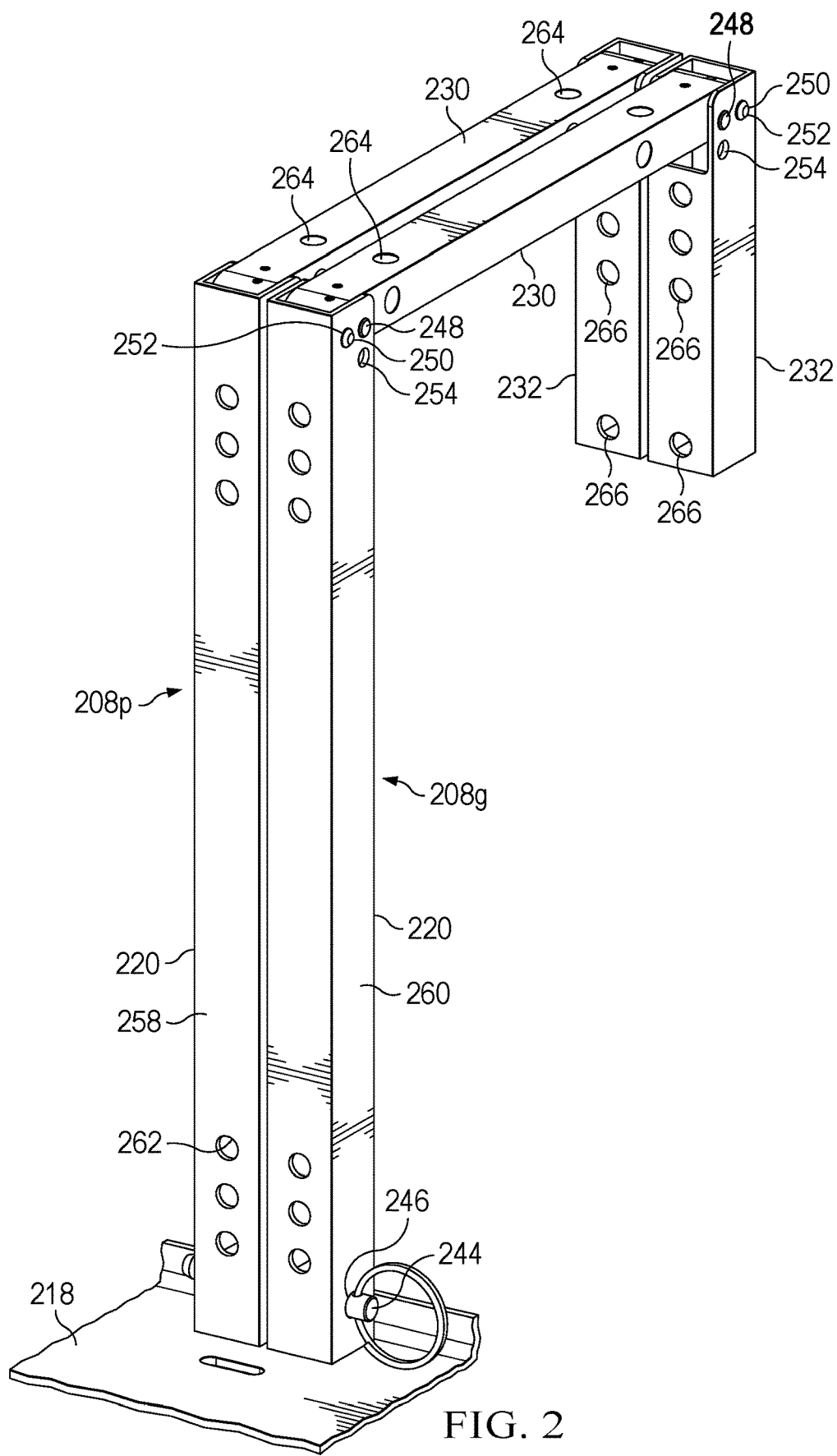
FIG. 2 is a perspective view of a pair of support braces used to hold the snake barrier of FIGS. 1A and 1B in an erect configuration.
Figure 5:
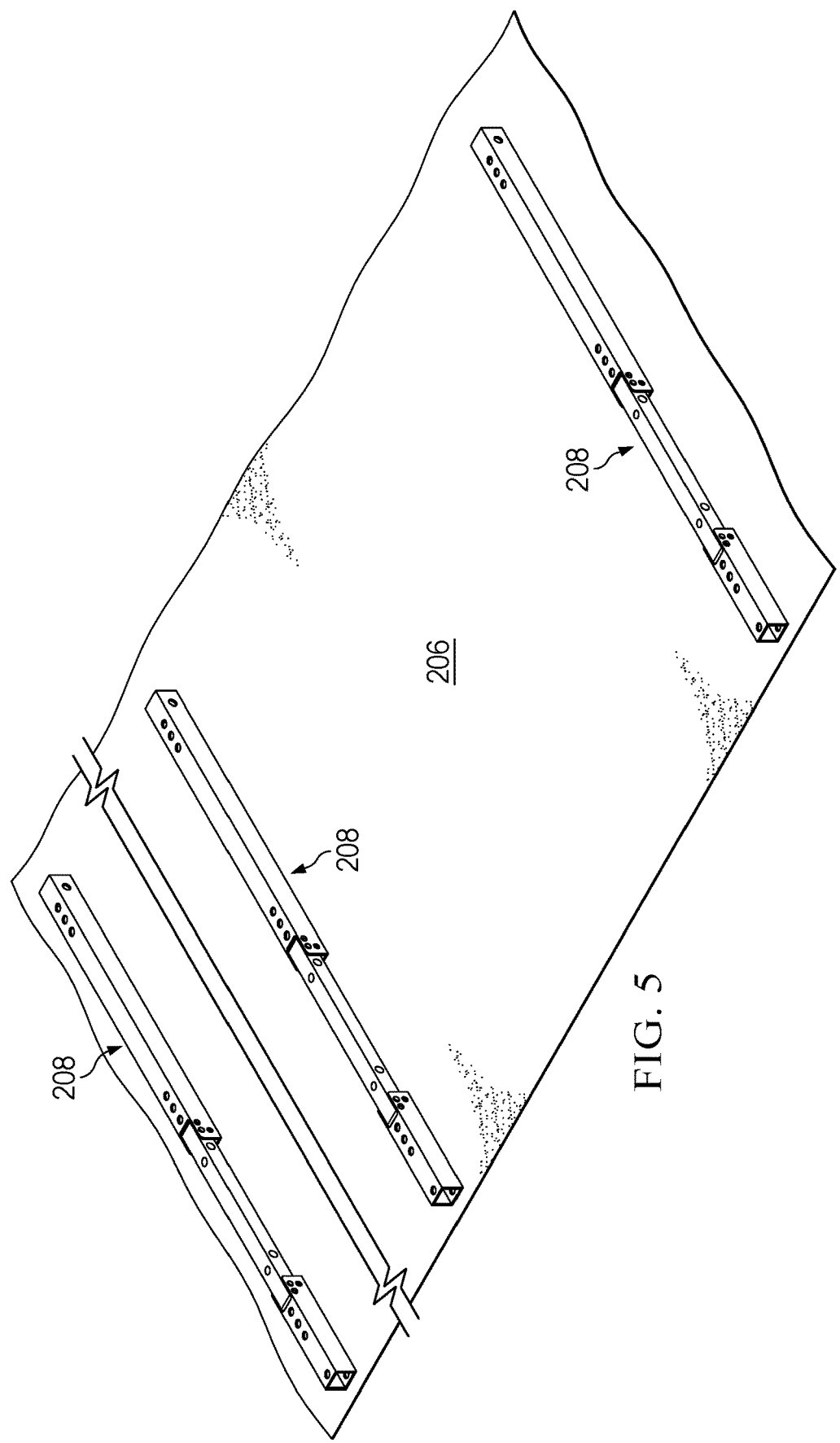
FIG. 5 is a perspective view of a section of a snake barrier in a lay-flat configuration.

FIG. 2 is a perspective view of the gate support brace 208g and the perimeter support brace 208p, which may be identical. Each of the support braces 208g and 208p are supported by the same base plate 218. The screen material 206 is removed in FIG. 2 to better show the details of the support braces 208. The support brace 208 (i.e. 208p and 208g) generally has a flat-laying position, (also referred to as a lay-flat configuration), as shown in FIG. 5 and an erect position, as shown in FIGS. 1A and 1B. In the lay-flat position, the support brace 208 is more easily shipped and stored. For example, the support braces 208 attached to the screen material 206 may be rolled to allow it to fit in a bag. In addition, as described further below, positioning support braces 208 in the lay-flat orientation facilitates assembly of the snake barrier 200. In the erected position shown in FIGS. 1A and 1B, a plurality of support braces 208 secured to multiple base plates 218 maintains the screen 206 in the barrier configuration shown.

According to other embodiments, gate support brace 208g or perimeter support brace 208p can be capable of connecting one section of screen material 206 to another section of screen material 206. Many types of commercially available screen material 206 are available in pre-cut lengths, commonly in 100 foot long sections. Some applications may require more than 100 linear feet of screen material 206, and thus abutting section perimeter sections may employ abutting perimeter support braces 208*p* that maintain a constant perimeter without a break in perimeter sections of the screen material 206. In this manner, a perimeter may be extended to any suitable length.

The support brace 208 includes an upright or vertical member 220. According to an embodiment, a pin 244 that is received through a pin receiving hole 246 retains the upright member 220 to the base plate 218, as discussed in more detail with respect to FIG. 6. Alternatively, a different type of fastener, such as a bolt, screw, rivet or any other suitable fastener may be used in lieu of the pin 244. In the embodiment shown in FIG. 2, a single pin 244 is received through the pin receiving holes in the upright members 220 of both the gate support brace 208*g* and the perimeter support brace 208*p* to secure each of the support braces 208*p*, 208*g* to the base plate 218 and to each other with a single pin 244.

An overhang support member 230 is pivotably coupled to the upright member 220. According to an embodiment, the overhang support member 230 rotates about a pivot pin 248 at least ninety degrees to allow the support brace to be configured in the erect, J-configuration shown in FIG. 2 or the lay-flay configuration shown in FIG. 5. An opposite end of the overhang support member 230 is pivotably coupled to a skirt support member 232. The skirt support member 232 rotates about a pivot pin 248 through at least a ninety degree angle to allow the support brace 208 to be configured in the erect, J-configuration. The overhang support member 230 may include one or both rounded ends to facilitate pivoting with respect to the upright member 220 and the skirt support member 232.

According to an embodiment, a retractable button 250 is received in an erect-configuration hole 252 to inhibit further rotation and secure the skirt support member 232 in the position shown with respect to the overhang support member 230. The retractable button 250 may be received in a lay-flat-configuration hole 254 to secure the skirt support member 232 aligned with the overhang support member 230 in the lay-flat configuration.

According to an embodiment, each of the upright member 220 and the skirt support member 232 are formed of metal tubing, for example aluminum or other suitable metal. The tubing may be formed in a generally hollow box-like shape with a wall on each of four sides of the box-like shape. The upright member 220 includes a front wall 256 (see FIG. 4), a rear wall 258, and opposed side walls 260. The overhang support member 230 may be formed from a solid bar of aluminum or other suitable metal. The solid bar, as opposed to the tubing walls, facilitate drilling blind holes to allow the pivot pins 248 and the retractable buttons 250 to be received and retained therein, as described in more detail with respect to FIG. 4. According an alternate embodiment, each of the upright member 220, the overhang support member 230, and the skirt support member 232 may be formed of solid metal bars and may have a square-shaped cross section. The metal material of the solid bars may be any suitable metal, such as aluminum. According to yet another alternate embodiment, a polymeric material may be used in lieu of metal. According to other embodiments, each of the upright member 220 and the skirt support member 232 is formed of sheet metal.

Each of the upright member 220, the overhang support member 230, and the skirt support member 232 may include one or more through holes to which the screen/mesh material 206 may be secured. According to an embodiment, a polymeric strap or tie may be received through the screen material 206 and through the through holes to secure the screen material to the respective members of the support brace 208. According to an alternate embodiment, a rivet, bolt, screw, or other suitable fastener may be received through the screen material 206 and through the through holes. In the case of a bolt, a nut may be secured to the bolt to secure the screen material 206 to the brace.

Figure 3:
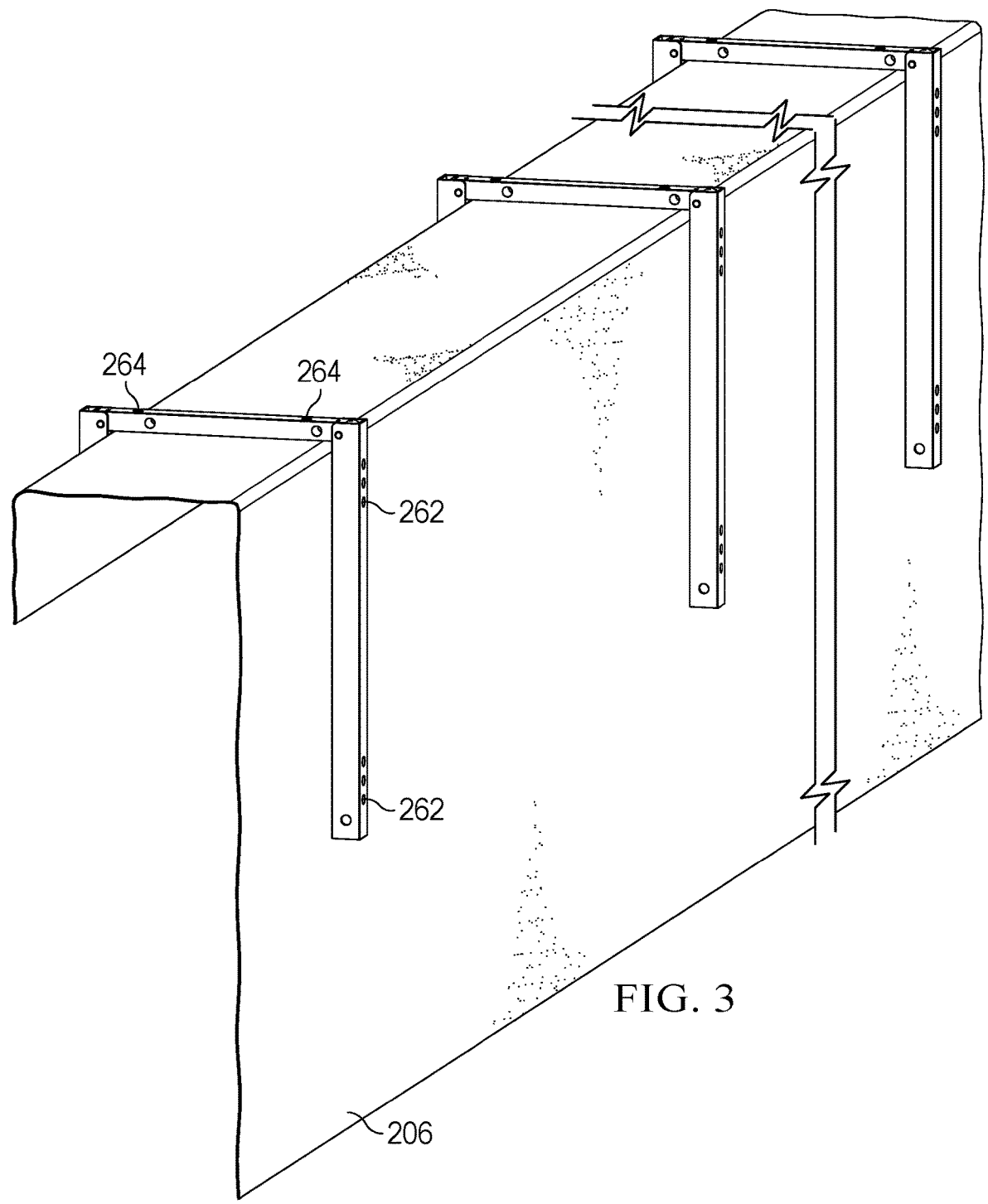
FIG. 3 is a perspective view a section of a snake barrier configured to be assembled to multiple base plates according to the teachings of the present disclosure.

Reference is now made to FIG. 3 with continuing reference to FIG. 2. FIG. 3 is a perspective view of the screen material 206 attached to multiple support braces 208 in the erect configuration. According to an embodiment, through holes 262 formed in the upright member 220 receive a fastener (not shown) that is also received through the screen material 206 to secure the screen material 206 to the upright member 220. Multiple through holes 262 may be formed at a bottom end and a top end of the upright member 220. When assembled to the base plate 218, the screen material 206 secured to the upright member 220 forms the upright portion 213 of the snake barrier 200 (see FIGS. 1A and 1B). Multiple through holes 264 are also formed through the overhang support member 230, for example at a forward end and a rear end of the overhang support member 230. A suitable fastener is received through the screen material 206 and the through holes 264 in the overhang support member 230 to secure the screen material 206 to the overhang support member 230. The screen material 206 secured to the overhang support member 230 forms the overhang portion 214 of the snake barrier 200 when the support braces are in their J-configuration and the snake barrier 200 is in its erect configuration. A plurality of through holes 266 are formed in the skirt support member 232, as shown in FIG. 2. A suitable fastener is received through the screen material 206 and through the through holes 266 in the skirt support member 232. The screen material 206 that is attached to the skirt support member 232 forms the skirt portion 216 of the snake barrier 200 in the erect configuration shown in FIG. 1A.

Figure 4:
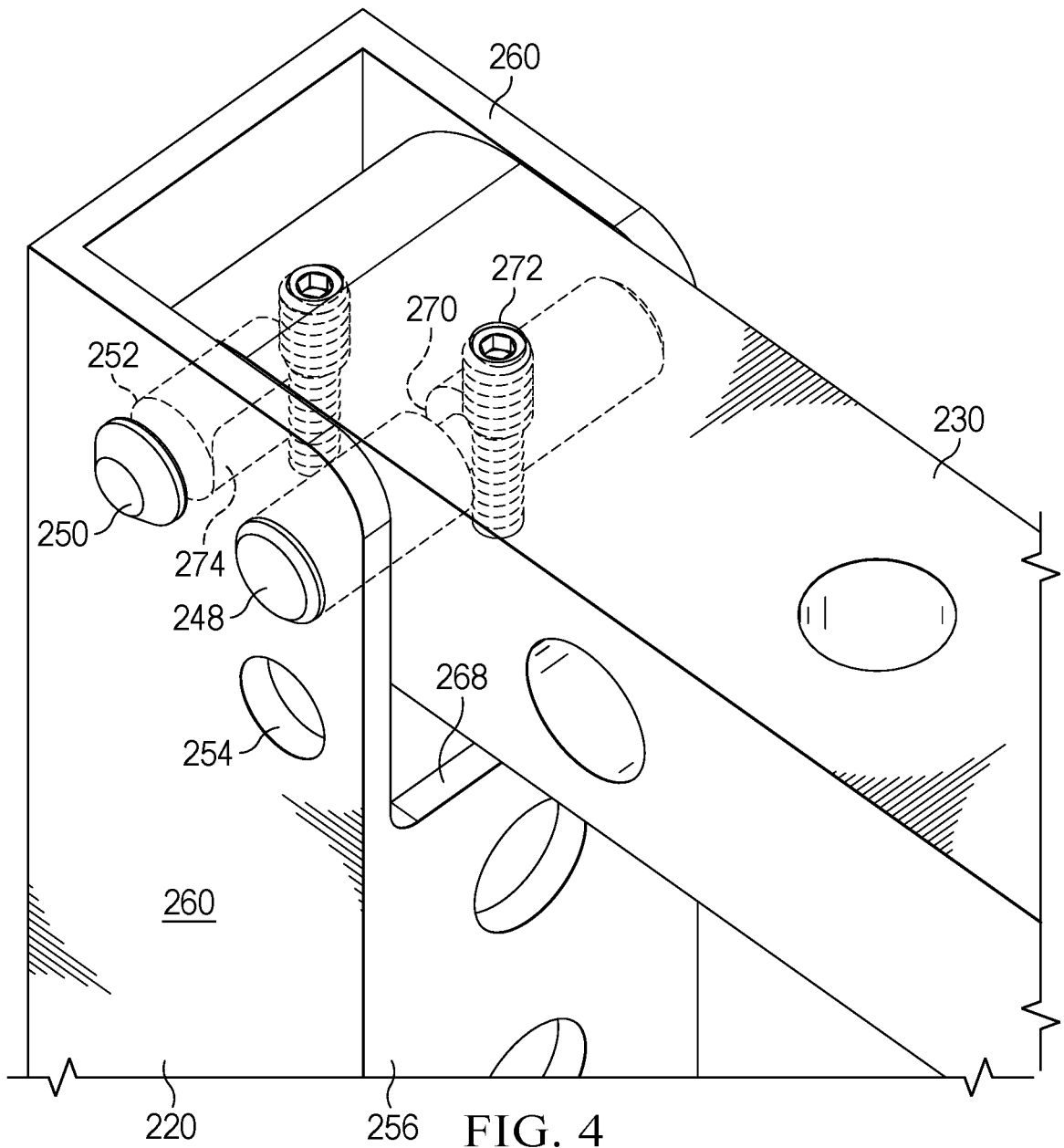
FIG. 4 is a detailed perspective view of a pivoting portion of a support brace used to hold the snake barrier of FIGS. 1A and 1B in an erect and a lay-flat configuration.

Reference is made to FIG. 4, which is a detailed, perspective view of the pivot coupling of the upright member 220 with the overhang support member 230. A rounded end of the overhang support member 230 is received through an opening 268 formed in the front wall 256 of the upright member 220 such that the rounded end of the overhang support member 230 is disposed between the side walls 260. The pivot pin 248 is received through the side walls 260 of the upright member 220 and the overhang support member 230. The pivot pin 248 pivotally joins the overhang support member 230 to the upright member 220 and creates a pivot axis for rotation of the members with respect to each other. According to an embodiment, a slot 270 is machined in the pivot pin 248. The slot 270 is sized and shaped to receive a shaft portion of a screw pin 272, which is threaded into the overhang support member 230. The screw pin 272 retains the pivot pin 248 in the position shown in FIG. 4. The retractable button 250 may be biased toward an extended position via a spring (not shown) disposed between the button 250 and floor of the blind hole in the overhang support member 230. According to an embodiment, the spring may be received in a blind hole formed in the overhang support member 230. The retractable button 250 is also partially received in the blind hole. By depressing the button 250, the button 250 retracts to release it from the hole 252 to allow the overhang support member 230 to rotate or pivot on the pivot pin 248. When the overhang support member 230 is pivoted to position in which the button 250 is aligned with the lay-flat hole 254, the spring causes the button 250 to extend to be received by the lay-flay hole 254. A groove 274 is formed in a shaft portion of the button 250. The groove 274 allows the button 250 to be displaced along its longitudinal axis a predetermined distance such that the button 250 retracts in the blind hole sufficiently to displace it from the lay-flat hole 254 or the erect-configuration hole 252 in the upright member 220.

The pivot coupling of the overhang support member 230 with the skirt support member 232 includes the same features and functions as described above with respect to the pivotable coupling of the upright member 220 with the overhang support member 230, and therefore for brevity the description will not be repeated.

Reference is made to FIG. 5, which is a perspective view of a portion of the snake barrier 200 with the screen material 206 and multiple support braces 208 in the lay-flat configuration. A section of the snake barrier 200 may be assembled by positioning a support brace 208 and the screen/mesh material 206 in the lay-flat orientation. The screen/mesh material 206 may be formed of any suitable material, such as aluminum or other light-weight metal forming a wire mesh. Alternatively, the screen/mesh-type material 206 may be a polymeric material, such as fiberglass. Any suitable sheet material that is flexible to sustain the lay-flat configuration and the erect configuration, such as canvas may be used according to the teachings of the present disclosure. In one example, the screen/mesh material 206 may be a vinyl coated polyester material. The openings in the screen/mesh material 206 may be any suitable size, but they should not be so large as to allow a snake to penetrate the screen material 206. According to one embodiment, a screen/mesh material 206 has approximately 23×17 holes per inch. In one embodiment, the screen/mesh material 206 may be adhered to the support brace using a suitable adhesive. Alternatively or in addition to the adhesive, a suitable fasteners, such as a screws or rivets may be received through the screen and through each of the upright member 220, the overhang support member 230, and the skirt support member 232, as described above with respect to FIGS. 2 and 3.

The retractable button 250 may be depressed to allow the overhang support member 230 to be rotated approximately ninety degrees with respect to the upright member 220 to position the screen/mesh material in an L-configuration where the retractable button 250 extends to be received in the erect configuration hole 252. The retractable button 250 may be depressed to allow the skirt support member 232 and the attached screen/mesh material 206 to rotate approximately ninety degrees with respect to the overhang support member 230, where the retractable button 250 extends to be received in the erect configuration hole 252. In this manner, the screen/mesh material 206 is in a J-configuration.

By joining the support braces 208 adjacent each other on the support plates 218, as further described below, a snake barrier, such as the snake barrier 200 shown in FIGS. 1A and 1B, may be erected to create a protected area 202.

The height of the low-profile snake barrier 200 is any suitable height that is at least tall enough to deter and prevent the vertical movement of snakes. In certain embodiments, such as a snake barrier 200 erected at a campsite, the low-profile snake barrier 200 may be short enough to be easily stepped over by an adult camper. For example, the height of the snake barrier 200 may be 6-18 inches tall. It is expected that a snake barrier 200 that is closer to 18 inches tall might be installed where stepping over the snake barrier 200 is expected to be less frequent. The overhang portion 214 can be any suitable length, such lengths are commonly approximately 2-8 inches, for example 5 inches from the upright portion 213. The skirt portion 216 may extend downward approximately 2-8 inch from the overhang portion 214. Also, a section of the snake barrier 200 may be any suitable length provided it maintains its generally J-shape, as illustrated. For example, a section of the snake barrier 200 supported in each end by a support brace 208 can be any suitable length, such lengths can be approximately 3-9 foot long, where a section of the snake barrier 200 that is approximately 6 feet in length may be formed from more rigid material than a 3 foot section.

Figure 6:
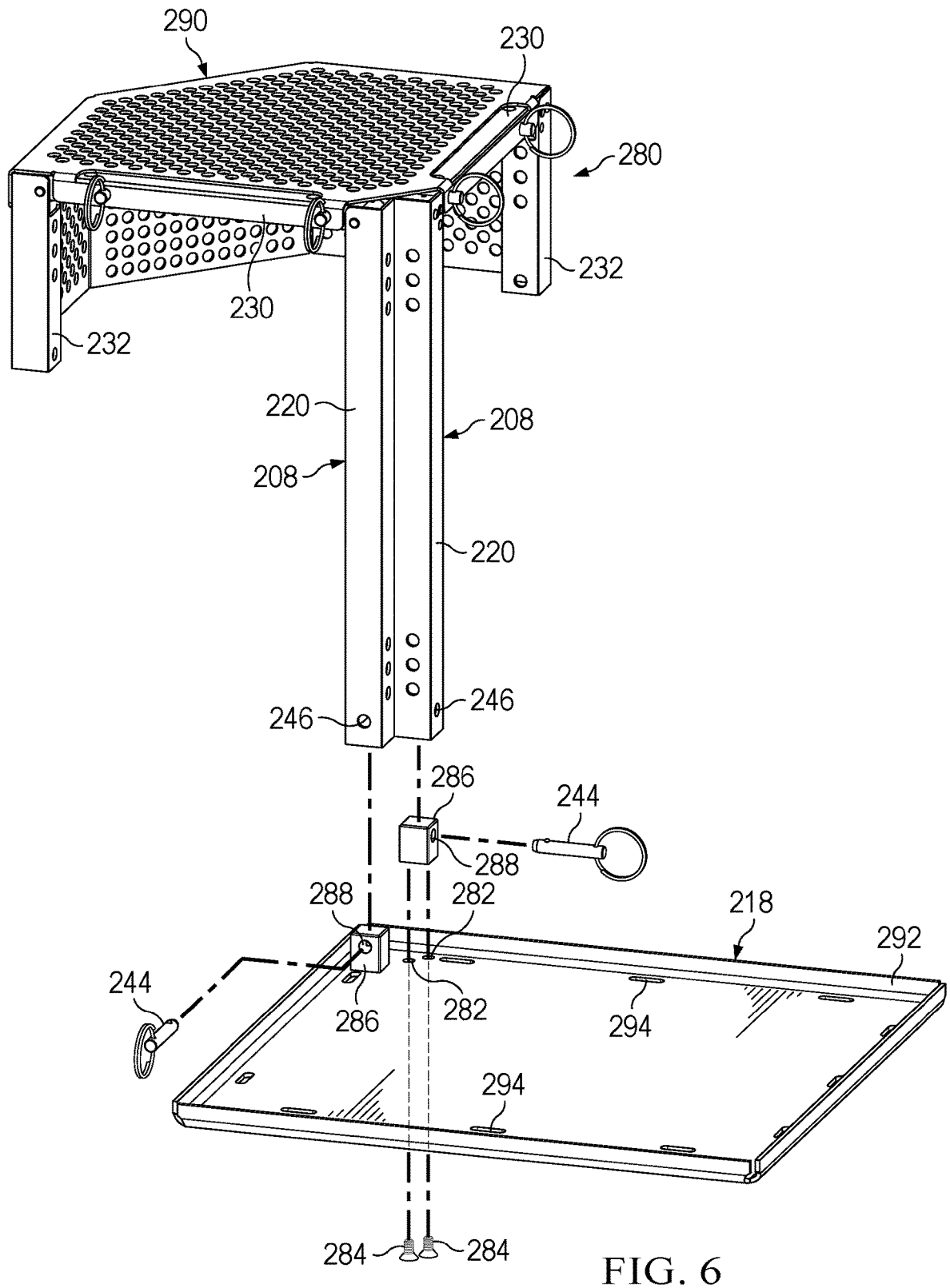
FIGS. 6 and 7 are partially exploded perspective view of a corner cap for the snake barrier according to the teachings of the present disclosure.

Reference is now made to FIG. 6, which is a partially exploded, perspective view of a corner assembly 280 of the snake barrier 200. The corner assembly 280 includes the base plate 218 and a pair of support braces 208. The support plate 218 includes a plurality of through holes 282 disposed proximate a corner of the support plate 218. Fasteners 284 are received through the through holes 282 and into respective threaded holes formed in a connector block 286. There may be two fasteners 284 that are generally short screws that are received in each of two corresponding threaded holes formed in a bottom of the connector block 286. According to certain embodiments, the connector block 286 may be generally solid cube-like structures formed of any suitable material, such as aluminum. Multiple threaded blind holes are formed through a bottom surface of the cube. The two fasteners 284 may prevent unintended rotation or loosening that might occur with only a single fastener 284. A pin receiving hole 288 is formed through the cube.

The connector block 286 is received within an open bottom end of the upright member 220. The pin receiving through hole 246 formed in the sidewalls of the upright member 220 is aligned with the pin receiving hole 288 in the connector block 286. The ring pin 244 is received through the pin receiving hole 246 in the upright member 220 and the pin receiving hole 288 blank in the connector block 286. According to an embodiment, the ring pin 244 may include a ball detent locking mechanism. The pin 244 may also be referred to as a detent or a quick release pin. Other fasteners that may be received through the hole in the upright member 220 and the connector block, such as a bolt, rivet and the like or other suitable fasteners are contemplated by this disclosure. The ring pin 244 shown may allow quick set up and take down of the snake barrier 200. As such, the ball detent retainer pin 244 may be employed to join other components of the snake barrier. For example, as shown in FIG. 6, the ball detent retainer pin 244 may be used to secure the corner cap 290 to a pair of support braces 208.

The base plate 218 is a generally flat metal structure that may include perimeter walls 292 extending perpendicular from the body of the base plate 218. The base plate 218 is sized to have a surface area that allows it to support the sandbag 204. A sandbag 204 may be positioned on each base plate 218. The screen material 206 may be underneath the base plate 218 and therefore, the sandbag 204 holds the screen mesh material 206 in place, particularly on a hard surface, such as a tarmac of an airfield. The sandbags 204 may also be positioned on the screen mesh material 206, and not on a base plate 218 to hold down the screen mesh material 206. According to an alternate embodiment, the screen mesh material 206 may be positioned between the sandbag 204 and the base plate 218 such that the screen mesh material 206 is sandwiched between the sandbag 204 and the base plate 218.

The base plate 218 may include a plurality of perimeter through holes 294. The perimeter through holes 294 may be slot shaped to allow a tie-down to secure the sandbag 204 to the base plate 218. The base plate 218 may be formed of any suitable sheet metal, for example aluminum. The base plate 218 may be coated and/or painted to protect it from the elements.

Figure 7:
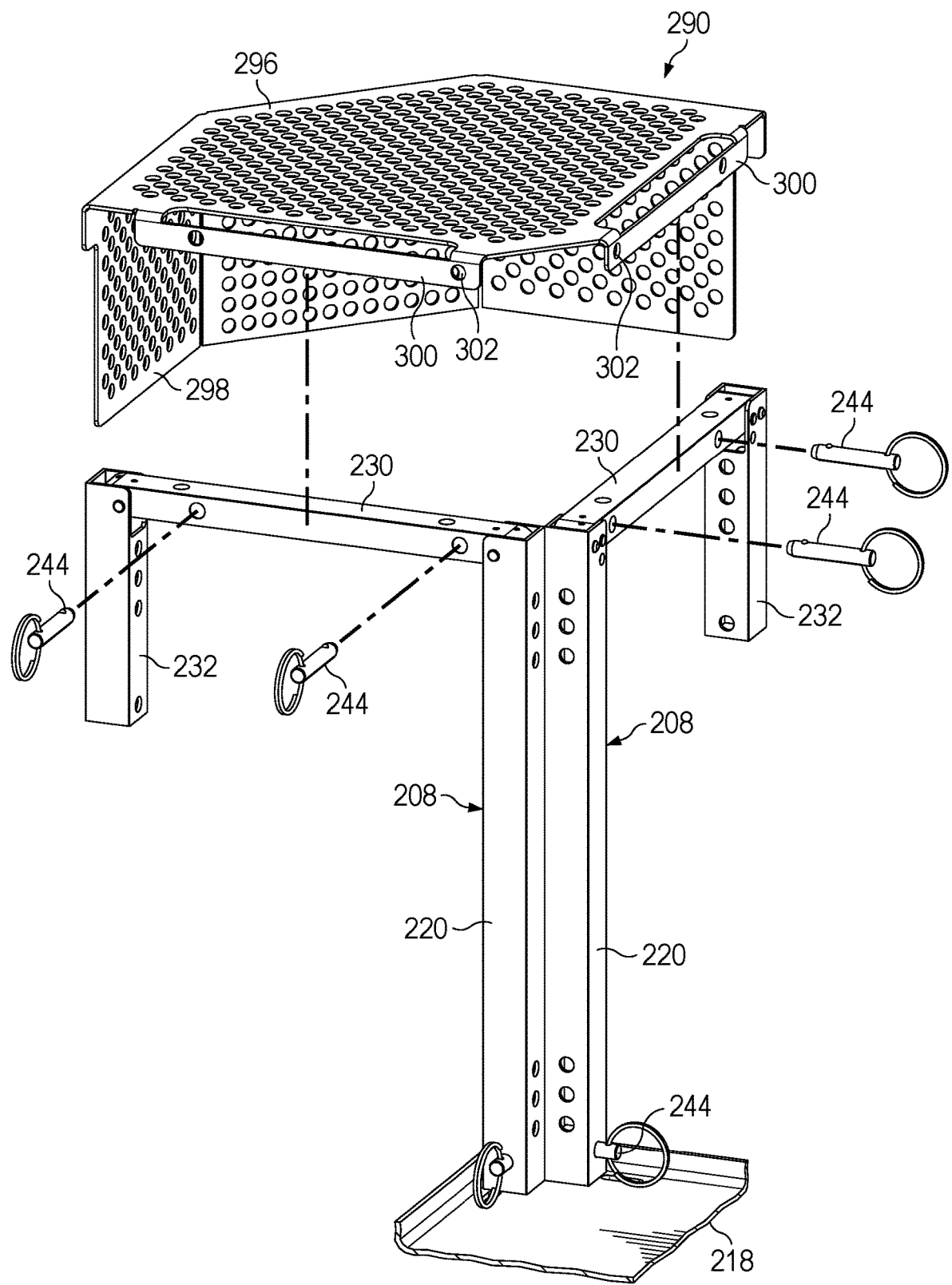

Reference is made to FIG. 7, which is a partially exploded perspective view of the corner assembly shown in FIG. 6. The support braces 208 are shown secured to the connector blocks 286, which are themselves secured to the base plate 218. The corner cap 290 is shown exploded from the pair of support braces 208. The corner cap 290 may be formed of sheet metal, such as aluminum, that is bent into the configuration shown. The corner cap 290 includes an overhang wall 296 and a skirt wall 298. The overhang wall 296 cooperates with the overhang portion 214 to generally form a roof to contain the snake and prevent it from slithering over the top of the snake barrier 200. The skirt wall 298 cooperates with the skirt portion 216 to deter and control the snake's movement, within the snake barrier 200 as described above. The corner cap 290 includes a pair of pin receiving walls 300 that are bent to envelop the overhang support member 230 of each support brace 208. The pin receiving walls 300 wall includes a pair of through holes 302 that align with corresponding through holes in the overhang support member 230. The corner cap 290 is set over the overhang support member 230 and the ring pins 244 are received through the pin receiving wall 300 and the holes in the overhang support member 230 to join the corner cap 290 to the support braces 208.

A side assembly that includes the perimeter support brace 208p is assembled the same as the corner assembly 280 with the exception that the connector blocks 286 are secured to the base plate 218 along a side of the base plate 218 adjacent each other.

Figure 8:
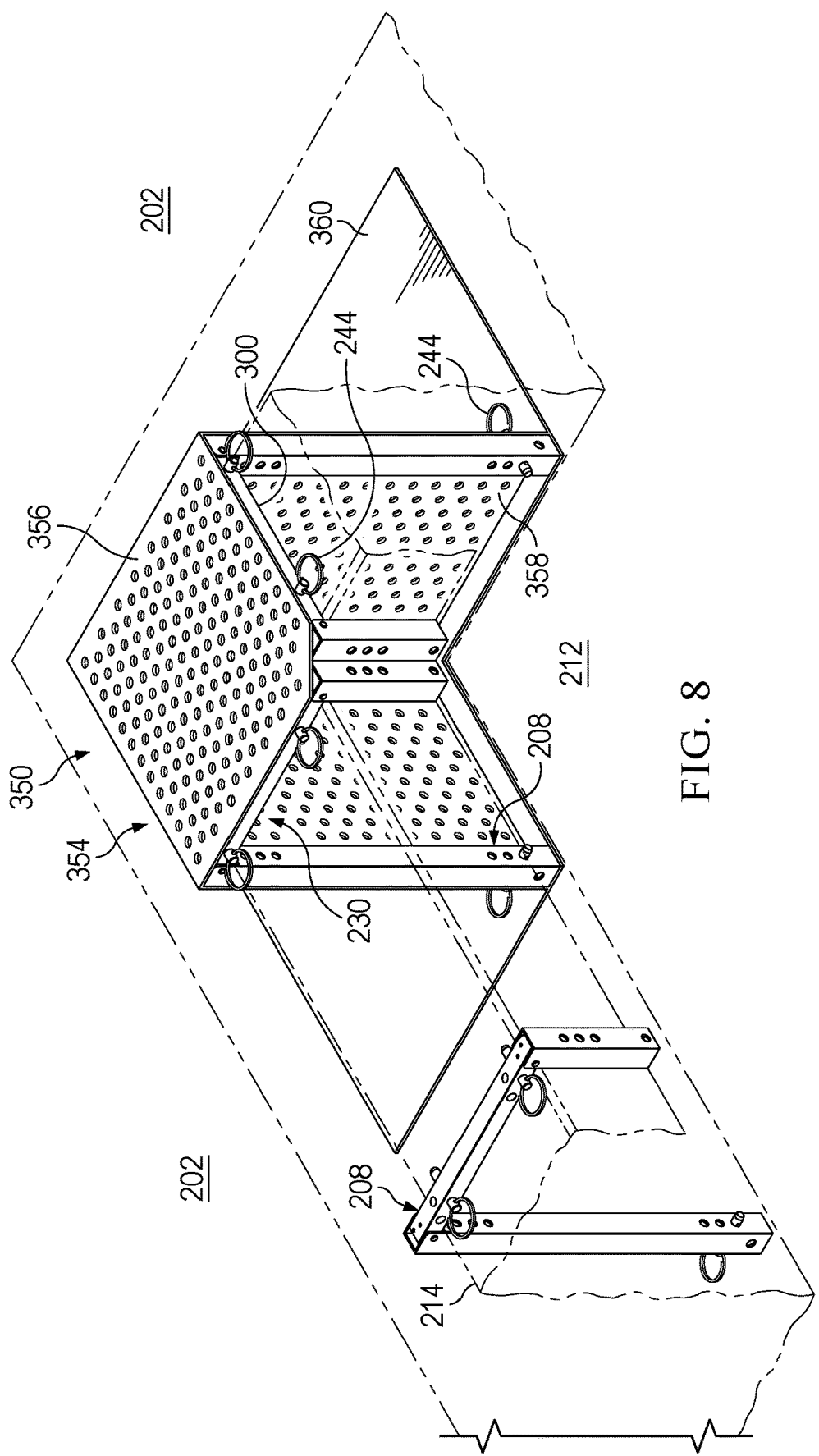
FIG. 8 is a perspective view of an alternate embodiment of a snake barrier according to the teachings of the present disclosure configured to keep snakes in a bounded area.

Reference is now made to FIG. 8, which is a perspective view of an alternate embodiment of a snake barrier 350 that is erected to keep snakes in an area 352 bounded by the snake barrier 350. In this embodiment, the support braces 208 and their respective screen material 206 may oriented such that the overhang portions 214 extend toward the bounded area 352. The support braces 208 are the same as described with respect to FIGS. 1-7. The base plates 218 are the same as described above with respect to FIGS. 1-7 with respect to the gate barrier portion 240 and the perimeter barrier portions 242. Similar to the embodiments described above, the support braces 208 are secured to connector blocks, which are secured to the base plate 218.

Figure 9:
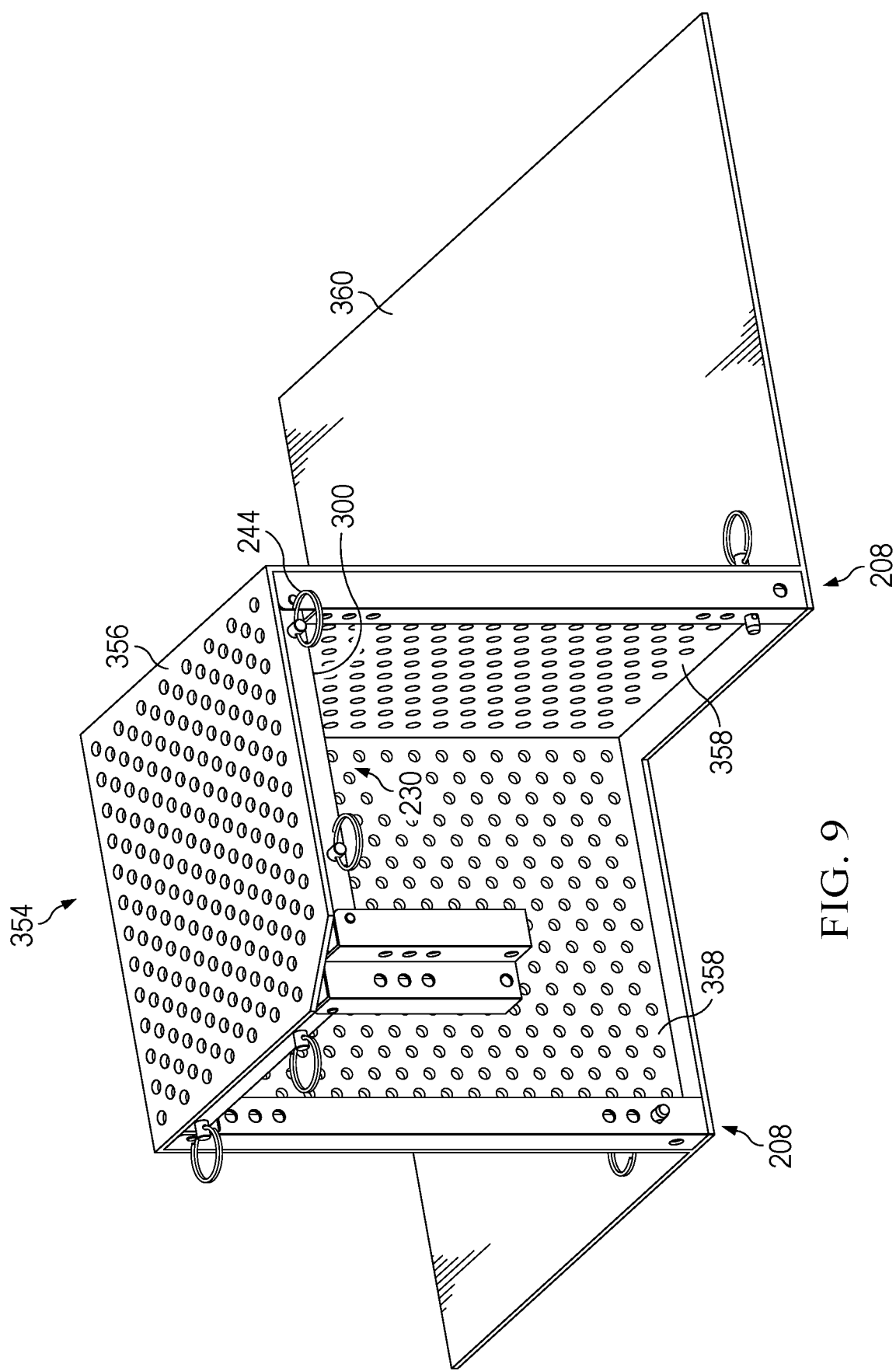
FIG. 9 is a perspective view of a corner cap used in the embodiment of the snake barrier shown in FIG. 8.

Reference is made to FIG. 9 with continuing reference to FIG. 8. FIG. 9 is a perspective view of a corner cap 354 that is configured to accommodate the inward extending support braces 208. The corner cap 354 is supported by a pair of support braces 208. Each of the support braces 208 is disposed at an end of a perimeter barrier portion 242 of the snake barrier 350. As such, the skirt portions 216 abut of the perimeter barrier portions 242 that intersect at the corner also abut each other, and thus the corner cap 354 does not require a skirt wall.

The corner cap 354 may be formed of a rigid material, such as aluminum or other suitable metal or polymeric material. The corner cap 354 may be perforated, or alternatively may be a solid piece of sheet metal. Perforations or holes in the corner cap 354 may allow a user to view a snake through the corner cap 354. The corner cap 354 includes a roof 356 and two upright walls 358 extending from the roof 356 to the base plate 360. The base plate 360 may be similar to the base plate 218, but it may have a cut out underneath the roof 356. According to an alternate embodiment, the cutout may be omitted. The roof 356 includes pin receiving walls 300 that are disposed around the overhang support members 230 and are secured to the overhang support members 230 with ring pins 244, similarly as discussed above with respect to FIGS. 6-7. According to an embodiment, the roof 356 of the corner cap 354 may be approximately 2-8 inches by 2-8 inches, but other sizes are contemplated by the present disclosure. The general dimensions of the roof 356 will correlate to the dimensions of the overhang portion 214. The base plate 360 may support sand bags or stakes, similar to that described above with respect to FIG. 1B.

While many of the embodiments of the snake barrier described above are constructed of rigid materials for durability, the snake barrier can be constructed of a mesh galvanized wire having openings smaller than the body of a snake. The mesh wire can be formed in the shape of any of the snake barriers described above to deter upward movement of a snake.

The various embodiments described above can be formed into a perimeter to form an enclosed area that is protected from encroachment by snakes. It should be understood that the individual aspects and features of the various embodiments can be used with any of the disclosed embodiments and should not be construed as being adapted only for the embodiment described therewith.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "clockwise" and "counterclockwise", "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A snake barrier, comprising:
 a first barrier section and a second barrier section forming a boundary, each of the first and second barrier sections comprising:

an upright portion and an overhang portion extending generally perpendicular to the upright portion, the upright portion and the overhang portion formed at least partially of a material, a first support brace secured to the material at a first end of each barrier section, the first support brace comprising a first upright member supporting the upright portion and a first overhang support member supporting the overhang portion; and a second support brace secured to the material at a second end of each barrier section opposite the first end, the second support brace comprising a second upright member supporting the upright portion and a second overhang support member supporting the overhang portion; and first and second connector blocks each removably coupled to a base plate, the first support brace of the first barrier section being removably coupled to the first connector block using a retainer pin and the first support brace of the second barrier section being removably coupled to the second connector block.

2. The snake barrier of claim 1 wherein the material is a screen-type material.

3. The snake barrier of claim 1 wherein the base plate sits on a portion of the material.

4. The snake barrier of claim 3 wherein the base plate is configured to support a sandbag.

5. The snake barrier of claim 1 wherein the first connector block has a through hole configured to receive the retainer pin.

6. The snake barrier of claim 1 wherein for each barrier section, the first upright member is pivotable with respect to the first overhang support member.

7. The snake barrier of claim 6 wherein for each barrier section, the first support brace further comprises a biased retractable button operable to be received in a corresponding aperture in the first upright member to position the first overhang support member generally perpendicular to the first upright member.

8. The snake barrier of claim 1 wherein for each barrier section, the first upright member includes a plurality of through holes each receiving a fastener to secure the material to the first upright member.

9. The snake barrier of claim 1 wherein for each barrier section, the material is a screen-type material and the screen-type material is secured to the first and second support braces using an adhesive.

10. The snake barrier of claim 1 further comprising a corner cap supported by the second support brace of the first barrier section.

11. The snake barrier of claim 10 wherein the corner cap includes a plurality of through holes configured to receive pins to secure the corner cap to the second support brace of the first barrier section.

12. The snake barrier of claim 11 wherein the corner cap comprises a skirt wall extending from an overhang wall.

13. The snake barrier of claim 11 wherein the corner cap comprises a pair of upright walls extending from a roof.

14. The snake barrier of claim 1 further wherein each barrier section further comprises a skirt portion extending generally perpendicularly from the overhang portion, the first support brace further comprising a first skirt support member and the second support brace comprises a second skirt support member, the first and second skirt support members supporting the skirt portion.

15. The snake barrier of claim 1 wherein the retainer pin removably couples the first support brace of the second barrier section to the second connector block.

16. The snake barrier of claim 1 wherein the retainer pin is a first retainer pin and further comprising a second retainer pin that removably couples the first support brace of the second barrier section to the second connector block.

* * * * *